US006862370B2

(12) United States Patent
Yamagata et al.

(10) Patent No.: US 6,862,370 B2
(45) Date of Patent: Mar. 1, 2005

(54) IMAGE DETECTING METHOD, IMAGE DETECTING SYSTEM, PROGRAM, AND RECORDING MEDIUM FOR IMAGE DETECTION

(75) Inventors: Hideaki Yamagata, Kanagawa (JP); Michiyoshi Tachikawa, Kanagawa (JP); Toshio Miyazawa, Tokyo (JP); Hiroshi Shimura, Kanagawa (JP); Miwa Kawano, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 673 days.

(21) Appl. No.: 09/855,665

(22) Filed: May 16, 2001

(65) Prior Publication Data

US 2002/0006223 A1 Jan. 17, 2002

(30) Foreign Application Priority Data

May 19, 2000 (JP) ....................................... 2000-147405

(51) Int. Cl.[7] ............................................... G06K 9/48
(52) U.S. Cl. ....................................... 382/199; 382/203
(58) Field of Search ................................. 382/199, 203, 382/204, 117, 118, 151, 152, 106, 181–190, 206, 209, 217, 219, 136–137, 276, 286–297, 176, 305; 340/988; 707/1–6, 104.1; 73/104

(56) References Cited

U.S. PATENT DOCUMENTS

| | | | |
|---|---|---|---|
| 4,748,676 A | | 5/1988 | Miyagawa et al. |
| 5,189,711 A | * | 2/1993 | Weiss et al. ................ 382/203 |
| 5,642,106 A | | 6/1997 | Hancock et al. |
| 5,796,869 A | | 8/1998 | Tsuji et al. |
| 5,854,854 A | | 12/1998 | Cullen et al. |
| 5,987,162 A | | 11/1999 | Nakata |
| 6,018,990 A | | 2/2000 | Ueki |
| 6,226,417 B1 | * | 5/2001 | Yamagata et al. .......... 382/289 |
| 6,370,271 B2 | * | 4/2002 | Fu et al. ..................... 382/217 |
| 6,636,634 B2 | * | 10/2003 | Melikian et al. ........... 382/217 |

FOREIGN PATENT DOCUMENTS

| | | | | |
|---|---|---|---|---|
| JP | 08115022 | * | 5/1996 | .......... G03G/21/04 |
| JP | 08279021 | * | 10/1996 | ............ G06K/9/32 |
| JP | 09147109 | * | 6/1997 | ............ G06T/7/00 |
| JP | 11-110562 | | 4/1999 | |

OTHER PUBLICATIONS

A. Eleftheriadis, et al., Signal Processing: Image Communication, vol. 7, No. 4, pp. 435–455, "Automatic Face Location Detection for Model–Assisted Rate Control in H.261–Compatible Coding of Video", Nov. 1 , 1995.
S. Kumar, et al., Pattern Recognition, vol. 27, No. 8, pp. 1019–1028, "Parallel Algorithms for Circle Detection in Images", Aug. 1, 1994.
Whoi–Yul Kim, et al., IEEE, pp. 391–396, "A Practical Pattern Recognition System for Translation, Scale and Rotation Invariance", 1994.
Hai Lin, et al., IEEE, pp. 2963–2967, "Chinese Signature Verification with Moment Invariants", 1996.
P. Sangassapaviriya, et al., IEEE TENCON–Speech and Image Technologies for Computing and Telecommunications, pp. 203–206, "Similarity Measures for Compressed Image Databases", 1997.

* cited by examiner

*Primary Examiner*—Leo Boudreau
*Assistant Examiner*—Sherali Ishrat
(74) *Attorney, Agent, or Firm*—Oblon, Spivak, McClelland, Maier & Neustadt, P.C.

(57) ABSTRACT

An image detecting method comprises the steps of: a) searching for a pattern satisfying a predetermined commencement requirement by scanning an input image; b) using the pattern as a starting point, with referring to a dictionary storing therein distances between the center line and an edge of a detection target semicircle, determining for each of a predetermined number of main scan lines along a sub-scan direction whether or not a predetermined edge pattern occurs within a respective range of the distance of the dictionary; and c) determining a detection of the semicircle when the number of error lines on which the predetermined edge pattern does not occur within the respective range of the distance of the dictionary is less than a predetermined threshold.

9 Claims, 8 Drawing Sheets

IMAGE DETECTING METHOD, IMAGE DETECTING SYSTEM, PROGRAM, AND RECORDING MEDIUM FOR IMAGE DETECTION

BACKGROUND OF THE INVENTION

1. Field of the Invention

The present invention generally relates to an image detecting method, an image detecting system, a program and a recording medium for rendering image detection, and, in particular, to an image detecting method, an image detecting system, a program and a recording medium for rendering image detection for detecting a semicircular image having a specific size.

2. Description of the Related Art

Recently, a technology in that a seal (having a circular outline in many cases) or the like printed on a document is identified automatically from an electronic image thereof is demanded. As such a technology, Japanese Laid-Open Patent No. 8-115022 discloses a method of detecting a circle included in an electronic image. In this method, continuity of the midpoints between edges of a circle are determined, and, thus, a specific circle is detected.

However, in such a method, in a case where edges of a circle are partially faint or have discontinuity, or positions of the edges are shifted due to various noises, continuity of the midpoints between the edges is not secured. Thereby, detection of the circle may not be performed successfully. Thus, this method is not robust against distortion of an image to be processed.

SUMMARY OF THE INVENTION

An object of the present invention is to provide a technology of identifying/detecting an image including a specific circle from an electronic image which is sufficiently robust against distortion of the image to be processed such as a faint edge, shift of the edge due to noise, and so forth.

According to the present invention, an image of a semicircle having a specific size possibly including discontinuity in an edge thereof, noise and so forth, can be detected at a high accuracy. Specifically, left and right edges are detected individually, thereby, discontinuity in edges or error due to noise is detected individually for the left and right edges. Accordingly, the robustness in the detection is improved. Furthermore, with regard to the detection of error, by appropriately changing the threshold for the error detection between a part possibly having much error and a part possibly having little error of the image of the semicircle. Thereby, it is possible to perform the detection of the semicircle with high robustness while reducing erroneous detection.

Further, in order to prevent increase of the number of candidates, a requirement for commencement of the detection is determined, and, the detection process is performed only in the case of satisfying the requirement. Accordingly, it is possible to effectively reduce the time required for the detection operation.

According to the present invention, first, a coordinate position having a pattern satisfying the semicircle detection commencement requirement is registered as a candidate of the semicircle. Previously, a dictionary having ranges of distances (the numbers of pixels) from the center line to an edge of the semicircle being drawn is prepared. Then, while this dictionary is being referred to, the upper semicircle is detected as a result of an outer edge having the above-mentioned pattern is traced along a sub-scanning direction. Each main scan line not satisfying the range according to the dictionary found out during the search is counted as an error. When the number of the counted errors exceeds a predetermined threshold, it is determined that the current candidate does not correspond to the target semicircle. When the number of main scan lines processed along the sub-scan direction searched as mentioned above reaches a target value of the radius of the target semicircle, it is determined that the current candidate corresponds to the target semicircle.

Other objects and further features of the present invention will become more apparent from the following detailed description when read in conjunction with the accompanying drawings.

DETAILED DESCRIPTION OF THE PREFERRED EMBODIMENT

Figure 1:
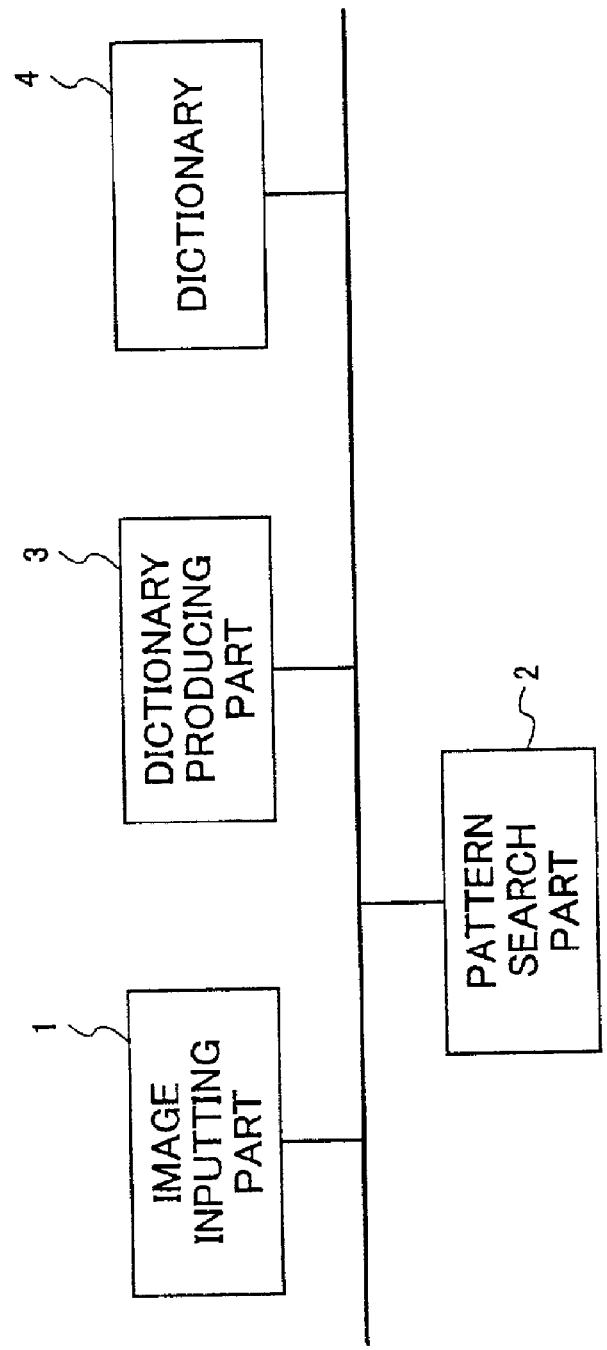
FIG. 1 shows a configuration of one embodiment of the present invention.

FIG. 1 shows an image detecting system in one embodiment of the present invention.

This system shown in FIG. 1 includes an image inputting part 1 such as a scanner inputting an image of a document or the like, a pattern search part 2 searching the input image input through the inputting part 1 for a semicircle as an image to be detected, a dictionary producing part 3 producing a dictionary 4 for a pattern of the semicircle to be searched for by the pattern search part 2, and the dictionary 4 produced by the dictionary producing part 3. In this system, images to be searched by the pattern search part 2 are not limited to those input through the image inputting part 1, and, images input through a network such as the Internet can also be searched thereby.

Figure 2:
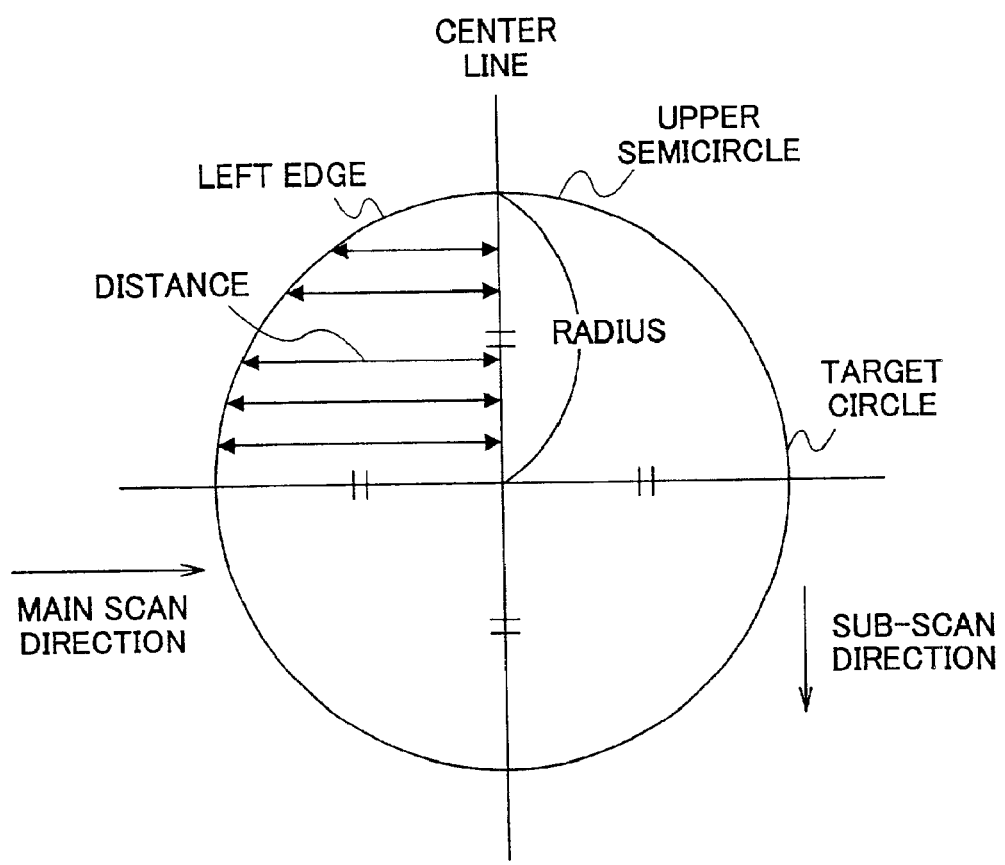
FIG. 2 illustrates production of a dictionary shown in FIG. 1.

First, how to produce the dictionary 4 will now be described. FIG. 2 illustrates data stored in the dictionary 4. As shown in the figure, the dictionary contains the data, i.e., a distance (the number of pixels) from a left edge (left arc) of a target circle to the center line thereof for each main scan line for a half (¼ circle) of the upper semicircle of the target circle assuming that a vertical direction in the figure as a sub-scan direction.

Further, the dictionary producing part 3 similarly measures a distance from an edge to the center line for a semicircle of each circle of those having radii longer/shorter than that of the above-mentioned target circle by ± several pixels. Then, the maximum value and minimum value of the thus-measured distance for each main scan line are stored for a respective distance (number of pixels) along the sub-scan direction from the top of the circle, as a range in which an outer edge pattern of a candidate figure can exist. Further, with regard to a value of the distance on or near the top side of the circle which is likely to be affected by possible distortion of the input image, a margin of several pixels is added thereto.

Figure 3:
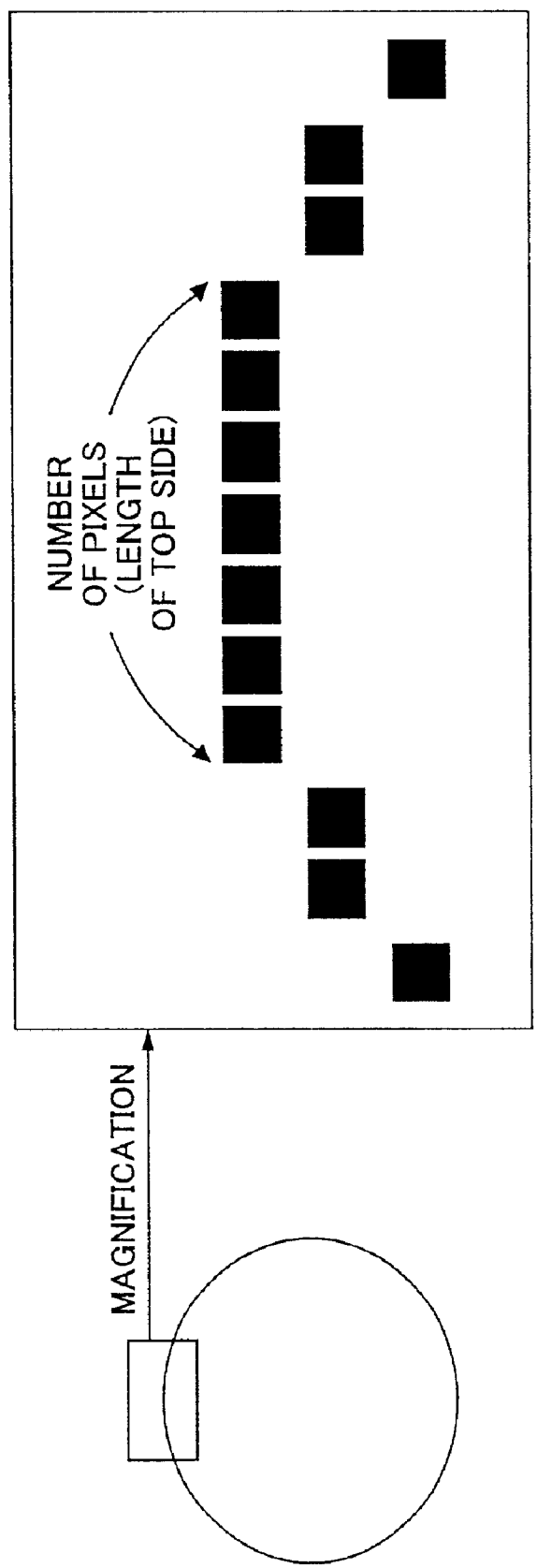
FIG. 3 shows a length of a top side of a semicircle to be detected through a system shown in FIG. 1.

The length (number of pixels) of the top side of the upper semicircle is determined from the lengths (each being a value twice the above-mentioned minimum value of the distance thereof) of the circles which were obtained from the target circle as mentioned above. FIG. 3 illustrates the length of the top side of the circle, for example. Also with regard to the length of the top side, a distance longer than the actual length by a predetermined range is actually used, in consideration of possible distortion of the input image.

As the semicircle to be detected is symmetrical with respect to the center line, the dictionary 4 stores therein only the data (left edge data) for the ¼ circle (left edge). Thereby, it is possible to reduce the size of the dictionary 4. At a time of pattern search, right edge data can be easily produced from the left edge data, and thus-obtained semicircle data is used as reference data for the search operation It is also possible that the dictionary 4 stores therein the whole semicircle data (left and right edge data).

Figure 4:
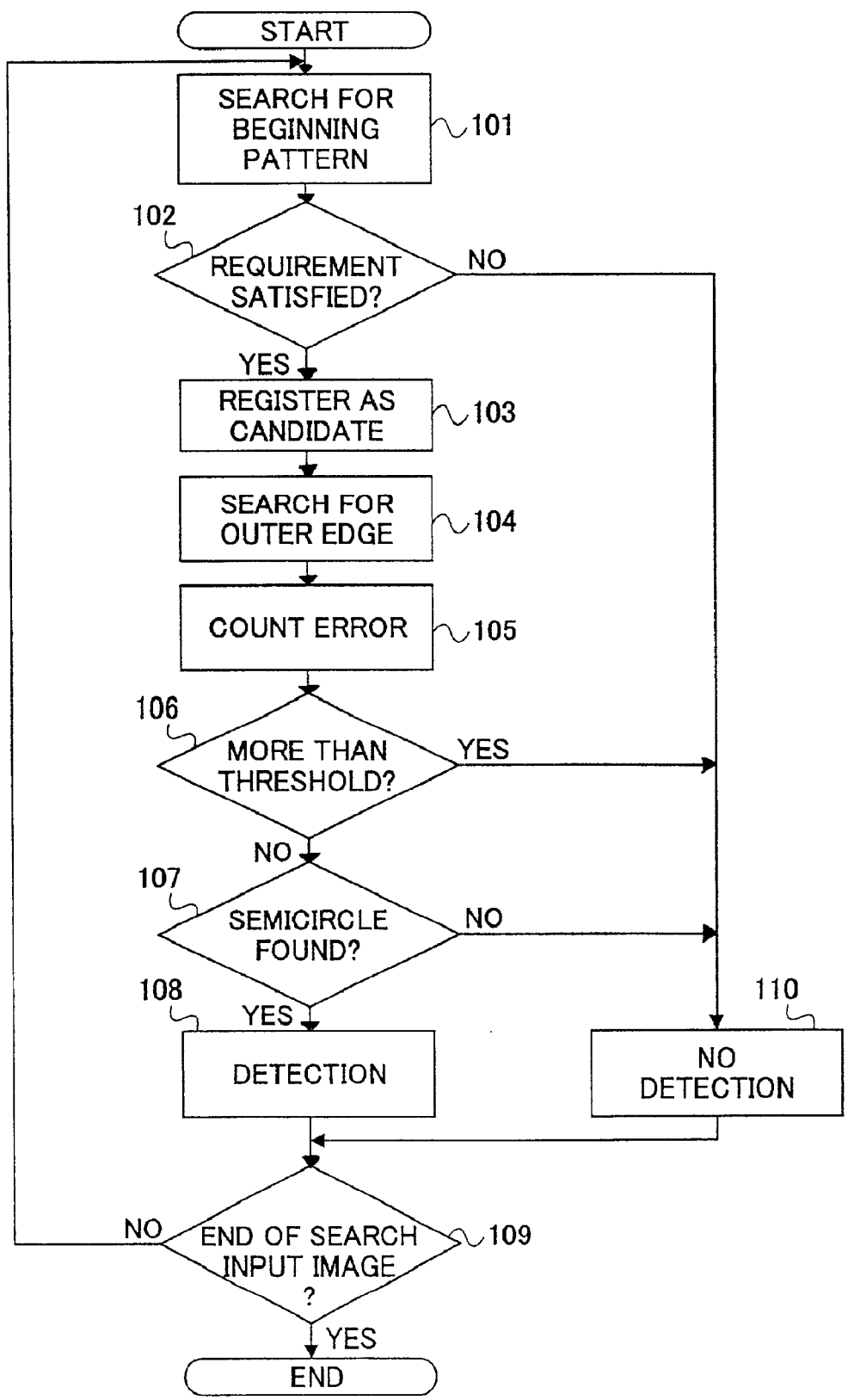
FIG. 4 shows an operation flow chart of detecting an upper semicircle, performed in the system shown in FIG. 1.

FIG. 4 shows an operation flow chart of detecting the upper semicircle in the embodiment of the present invention. As mentioned above, by using the length of the top side of the target semicircle, a pattern matching a search commencement requirement is searched for from the input image (in a step 101).

Specifically, the pattern search part 2 scans the input image along the main scan direction, and, thus, first, searches for a left outer edge pattern (i.e., a pattern of a predetermined number of successive white pixels, and, then, one black pixel in the main scan direction) on a current main scan line. When the left outer edge pattern is found out, it is determined whether or not a right outer edge pattern (i.e., a pattern of one black pixel, and, then, a predetermined number of successive white pixels) starts within a predetermined range of successive black pixels corresponding to the above-mentioned length of the top side of the semicircle previously stored in the dictionary 4. Then, when it is determined that the right outer edge pattern starts within the above-mentioned predetermined range corresponding to the length of top side from the previously found left outer edge pattern, it is determined whether or not the ratio of black pixels occurring between the black pixels of the above-mentioned left outer edge pattern and right outer edge pattern exceeds a predetermined threshold.

Simultaneously, it is determined whether or not the ratio of white pixels occurring at the same positions but on the immediately preceding main scan line exceeds a predetermined threshold. When the above-mentioned two ratios satisfy the above-mentioned requirements (thresholds) at the same time (YES of the step 102), the midpoint between the black pixels of the above-mentioned left outer edge pattern and right outer edge pattern is stored as one of a candidate of the semicircle (in a step 103). Then, the edge search is started (in a step 104).

Figure 5:
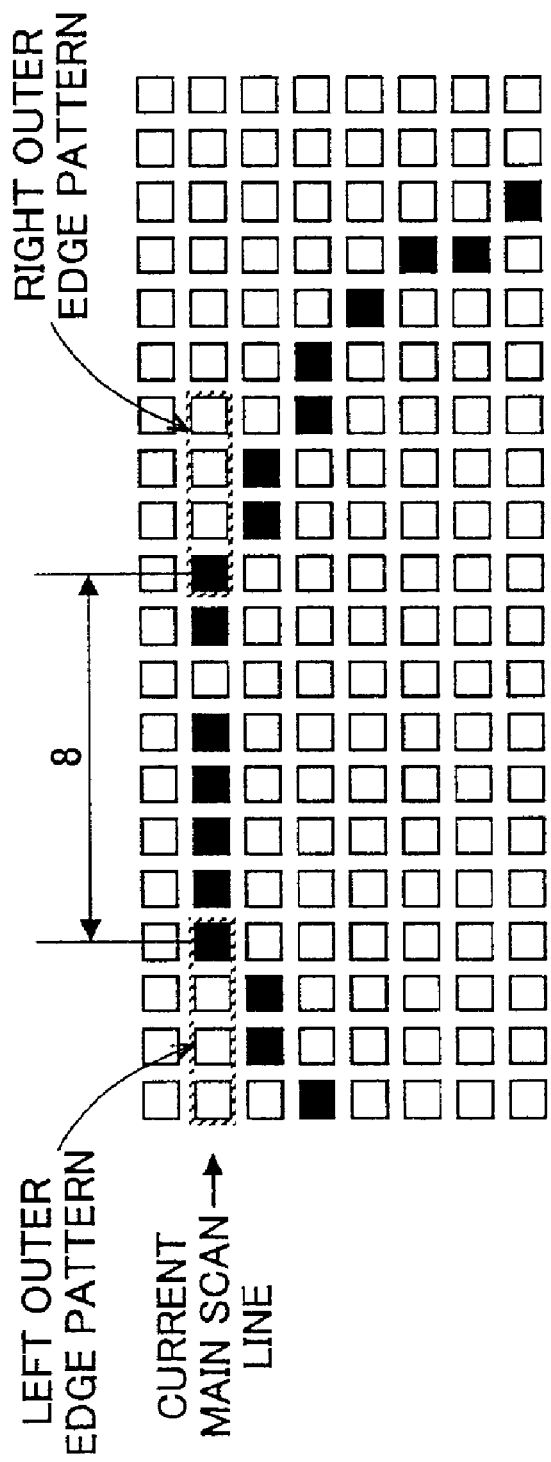
FIG. 5 shows an example of a pattern matching a search commencement requirement used in the method in the embodiment of the present invention shown in FIG. 4.

FIG. 5 illustrates an example of a pattern matching the above-mentioned search commencement requirement. In this example, on a current main scan line, a distance between black pixels of the left and right outer edge patterns is 8 pixels (within a predetermined threshold of 8, for example).

Then, the ratio of black pixels occurring between these black pixels of the left and right outer edge patterns is 87.5% (⅞, larger than a predetermined threshold of 82.5%, for example) as the number of the black pixels occurring there is 7. Then, the ratio of white pixels at the same positions but on the immediately preceding line is 100% (⅞, larger than a predetermined threshold of 50%, for example) as the number of the white pixels occurring there is 8.

By increasing the threshold of each of the above-mentioned ratios of black pixels and white pixels, it is possible to reduce a possibility of registering a figure which does not actually correspond to the detection target as a candidate thereof. However, thereby, the system becomes weaker against distortion of the input image.

Then, based on the position of the midpoint stored in the step 103, while it is repeatedly determined whether or not the left and right outer edge patterns such as those mentioned above of the arcs of the upper semicircle occur within the above-mentioned range (for the distance/number of pixels between the left/right edge and center line, as shown in FIG. 2) stored in the dictionary 4 for each main scan line, the outer edge patterns corresponding to the left and right arcs are traced along the sub-scan direction, and, thus, the upper semicircle is detected in a step 104.

Figure 6:
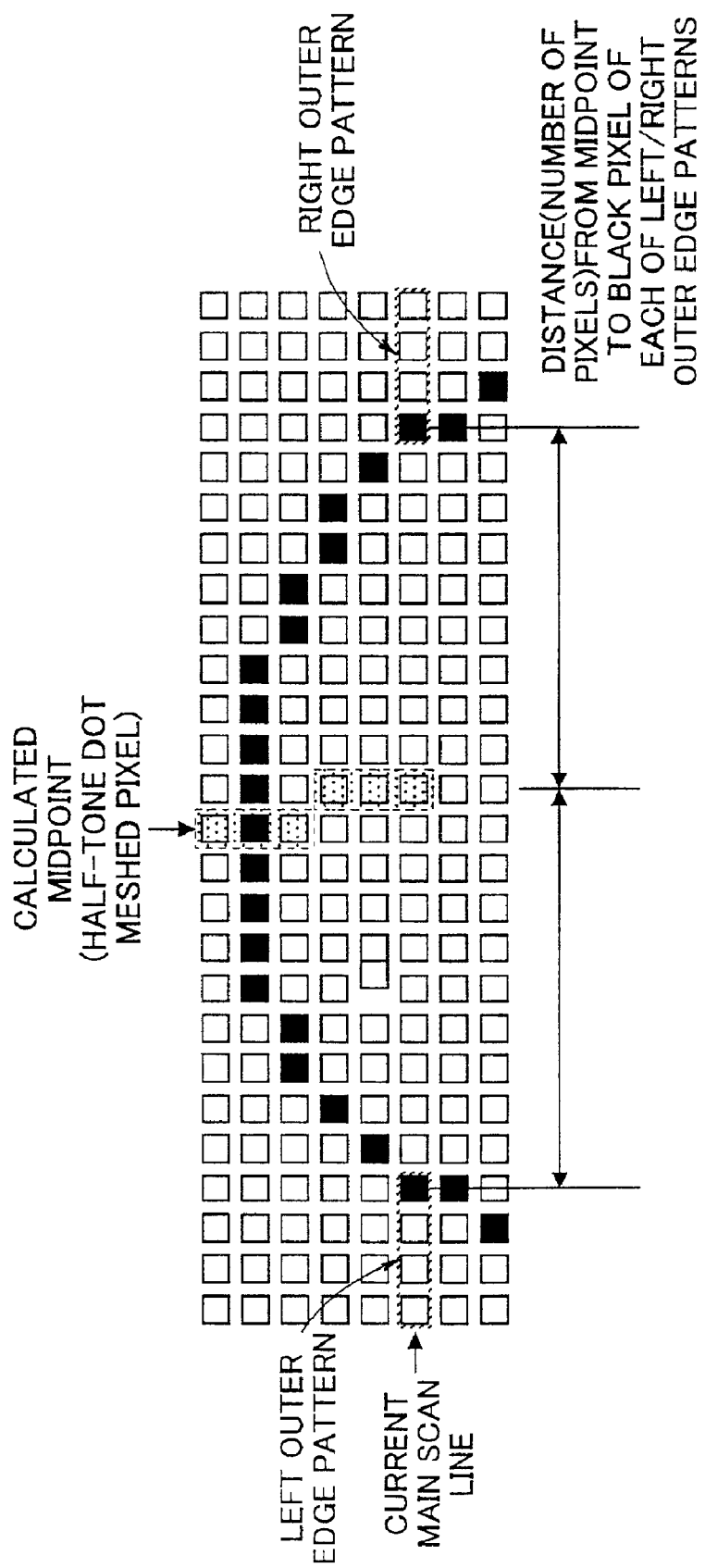
FIG. 6 illustrates detection of outer edge patterns of left and right arcs according to the method shown in FIG. 4.

FIG. 6 illustrates search for the outer edge patterns corresponding to the left and right arcs of the upper semicircle. As mentioned above, it is determined whether or not the distance (the number of pixels) between the calculated midpoint and the left/right outer edge pattern found occurring on the current main scan line is within the above-mentioned range stored in the dictionary 4. When each of the left and right outer edges occurs within the above-mentioned range stored in the dictionary 4 for the current main scan line, the position of the midpoint between the black pixels of these left and right outer edge patterns is re-calculated, and, then, is stored in the dictionary 4 in an overwriting manner as the data of midpoint used for the subsequent main scan line.

By making the above-mentioned predetermined number of successive white pixels of each of the left and right outer edge patterns variable, it is possible to adjust the intensity of robustness against possible noise of the input image, or to appropriately deal with features of the particular detection-target semicircle.

When the outer edge pattern does not occur within the respective range stored in the dictionary 4 in the step 104 for the current main scan line, an error is counted for the current candidate in a step 105. Three types of errors are assumed, i.e., the number of successive errors in that the left outer edge pattern does not occur within the range is counted; the number of successive errors in that the right outer edge pattern does not occur within the range is counted; and the number of cumulative errors in that the left or right outer edge pattern does not occur within the range is counted.

When the number of any of these three types of errors exceeds a respective predetermined threshold (YES in a step 106), the current candidate is excluded from candidates of the detection target semicircle (in a step 110). With regard to the above-mentioned successive errors, the count value is cleared to 0 for each of the left and right outer edge patterns when it occurs within the respective range of the dictionary 4. With regard to the above-mentioned cumulative errors, the total of errors in which no outer edge pattern occurs within the respective range of dictionary 4 for the left/right outer edge patterns is counted, and is not clear to 0 at any time. By appropriately controlling the thresholds for these respective errors, it is possible to detect a semicircular figure even having discontinuity in the edge thereof.

The above-mentioned process is repeated throughout the input image (in a step 109). When, for each candidate figure, the search has been performed through the number main scan lines corresponding to the target radius value of the semicircle to be detected, it is determined whether or not the difference between the distance (the number of pixels) between the given midpoint and the black pixel of any of the left and right outer edge patterns found on the current main scan line and the above-mentioned number of the main scan lines (the number of pixels) searched until now lies within a predetermined threshold, it is determined that the current candidate corresponds to the detection target semicircle (in steps 107 and 108).

Figure 7:
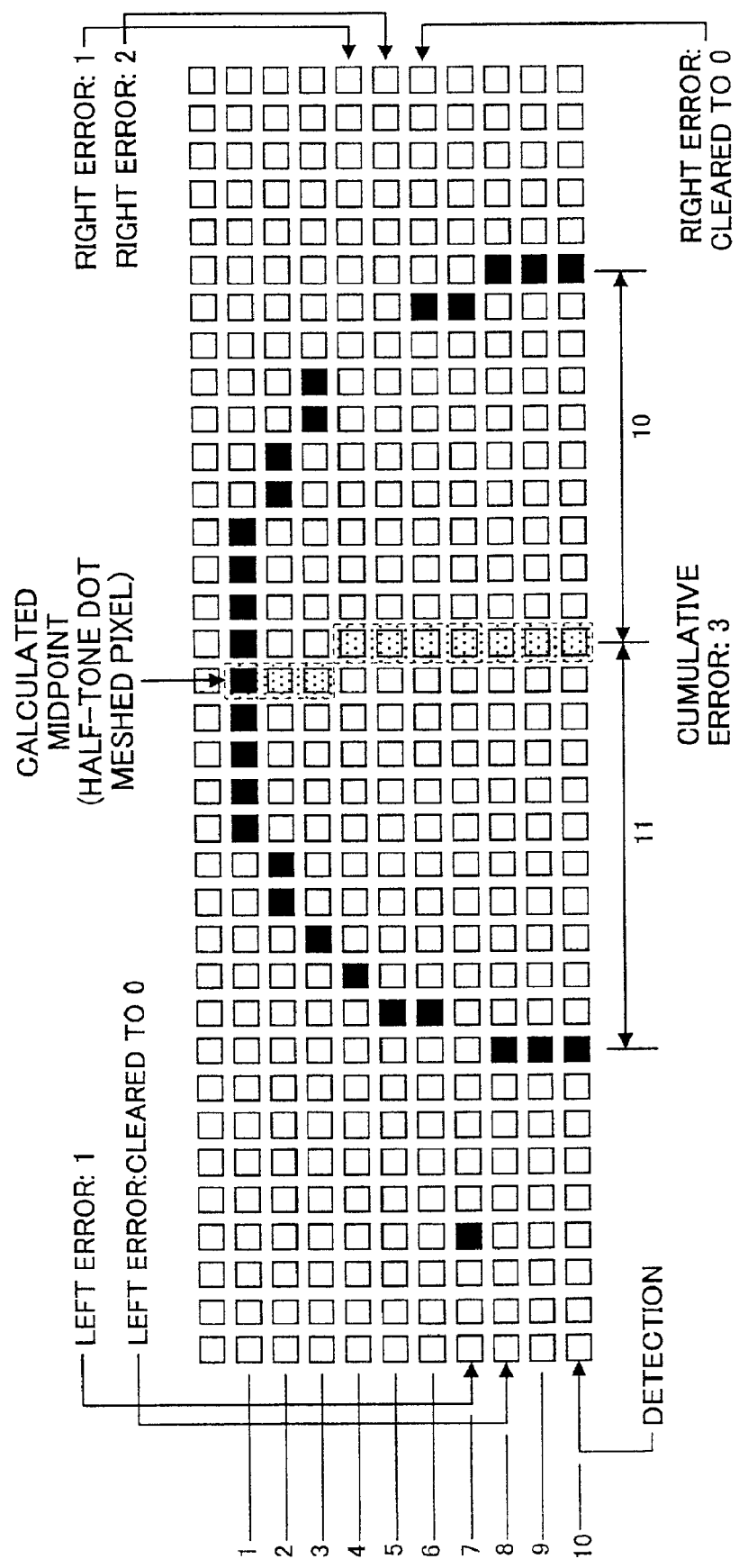
FIG. 7 illustrates counting of errors and detection of the semicircle according to the method shown in FIG. 4.

FIG. 7 illustrates an example of error counting and semicircle detection according to the present invention. In this example, the target radius value of the semicircle to be detected is 10±2 (pixels); the threshold for the successive errors is 3 (pixels); the threshold for the cumulative errors is 5 (pixels); and the threshold of the difference in distance between the number of searched main scan lines and the edge from the midpoint on the last main scan line is 1 (pixel). As shown in the figure, at a time the distance from the top side reaches the target radius of the detection target semicircle (10), the number of successive errors is 0 (pixels;, less than the above-mentioned threshold 3), and the number of cumulative errors is 3 (pixels; less than the above-mentioned threshold of 5). Further, on the tenth main scan line, the distance between the black pixel of the left outer edge pattern and the midpoint is 11 (pixels), and the distance between the black pixel of the right outer edge pattern and the midpoint is 10 (pixels). Thus, the larger difference (10–11) in distance between the number of searched main scan lines and any edge from the midpoint on the last main scan line (tenth line) is 1 (pixel; equal to the threshold 1). Accordingly, the semicircle is detected.

Based on the above-mentioned detection result of the semicircle, the center coordinate of the circle can be estimated in a case where the detection target is a circle.

Another example of detection of semicircle according to the present invention will now be described. In this example, the radius of the detection target semicircle is 58 through 64 pixels; the threshold of the number of the above-mentioned successive white pixels of the left/right outer edge patterns is 5 pixels; the threshold of the number of the above-mentioned successive errors is 3 pixels; the threshold of the number of the above-mentioned cumulative errors is 5; the threshold of the ratio of black pixels to be included in the beginning main scan line in the above-mentioned search commencement requirement is 82.5%; the threshold of the ratio of while pixels to be included in the immediately preceding main scan line at the same positions in the above-mentioned search commencement requirement is 50%; and the threshold of the difference in distance between the number of searched main scan lines and the edge from the midpoint on the last main scan line is 1 pixel.

These thresholds may be appropriately adjusted depending on the resolution of the input image, the size of the circle to be detected, and so forth.

The above-described embodiment of the present invention can be rendered through a general-purpose computer executing a software program which is previously recorded in a computer-readable recording medium such as a CD-ROM. The above-mentioned software program is installed in the computer which then executes the program, and, thus, renders the above-described process of detecting the semicircle described above with reference to FIGS. 1 through 7. Also in this case, the image to be processed may be an image input through a scanner, previously stored in a hard disk drive or the like, input via a network such as the Internet, or the like.

Figure 8:
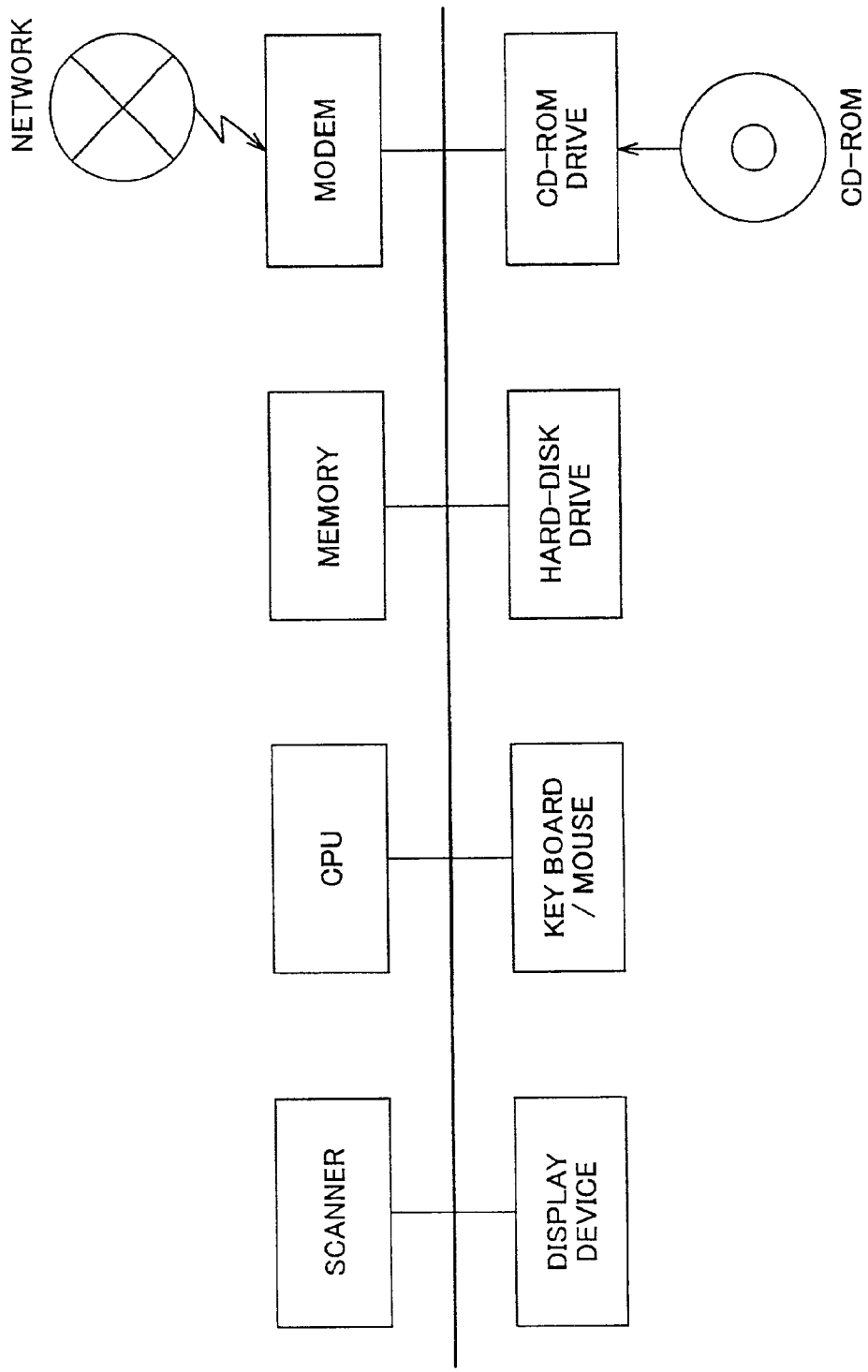
FIG. 8 illustrates a configuration of a general-purpose computer which can render the present invention.

FIG. 8 illustrates one example of the above-mentioned computer including a CPU executing the software program previously recorded in the CD-ROM, a memory used by the CPU for temporarily storing data/program as the necessity arises, a scanner for inputting an image to be processed, a display device for displaying the image and various data, keyboard/mouse for a user to input command/data appropriately, a hard disk drive for storing the software program read out from the CD-ROM through a CD-ROM drive and other various program/data, and a modem for communicating with a network such as the Internet.

Further, the present invention is not limited to the above-described embodiments, and variations and modifications may be made without departing from the scope of the present invention.

The present application is based on Japanese priority application No. 2000-147405, filed on May 19, 2000, the entire contents of which are hereby incorporated by reference.

What is claimed is:

1. An image detecting method comprising the steps of:
   a) searching for a pattern satisfying a predetermined commencement requirement by scanning an input image;
   b) using the pattern as a starting point, with referring to a dictionary storing therein distances between a center line and an edge of a detection-target semicircle, determining for each of a predetermined number of main scan lines along a sub-scan direction whether or not a predetermined edge pattern occurs within a respective range of a distance in said dictionary, wherein each main scan line not satisfying the range according to the dictionary is counted as an error; and
   c) determining a detection of the semicircle when the number of errors is less than a predetermined threshold.

2. The method as claimed in claim 1, wherein:
   the predetermined commencement requirement comprises requirements in which a ratio of black pixels occurring on a current main scan line between predetermined edge patterns is more than a predetermined value, and, also, a ratio of white pixels at the same positions but on an immediately preceding main scan line is more than a predetermined value.

3. The method as claimed in claim 1, wherein:
   the number of errors comprises any one of the predetermined main scan lines on which a predetermined left or right edge pattern does not occur, a number of successive main scan lines on which the predetermined left edge pattern does not occur, and the number of successive main scan lines on which the predetermined right edge pattern does not occur.

4. An image detecting system comprising:
   a part searching for a pattern satisfying a predetermined commencement requirement by scanning an input image;
   a part using the pattern as a starting point, with referring to a dictionary storing therein distances between a center line and an edge of a detection-target semicircle, determining for each of a predetermined number of main scan lines along a sub-scan direction whether or not a predetermined edge pattern occurs within a respective range of a distance in said dictionary, wherein each main scan line not satisfying the range according to the dictionary is counted as an error; and a part determining a detection of the semicircle when the number of errors is less than a predetermined threshold.

5. The system as claimed in claim 4, wherein:

the predetermined commencement requirement comprises requirements in which a ratio of black pixels occurring on a current main scan line between predetermined edge patterns is more than a predetermined value, and, also, a ratio of white pixels at the same positions but on an immediately preceding main scan line is more than a predetermined value.

6. The system as claimed in claim 4, wherein:

the number of errors comprises any one of the predetermined main scan lines on which a predetermined left or right edge pattern does not occur, a number of successive main scan lines on which the predetermined left edge pattern does not occur, and the number of successive main scan lines on which the predetermined right edge pattern does not occur.

7. A computer-readable recording medium storing therein a program, read by a computer, which thus executes the program so as to perform a process of detecting a predetermined figure, said program comprising:

first program code means for searching for a pattern satisfying a predetermined commencement requirement by scanning an input image;

second program code means for using the pattern as a starting point, with referring to a dictionary storing therein distances between a center line and an edge of a detection-target semicircle, determining for each of a predetermined number of main scan lines along a sub-scan direction whether or not a predetermined edge pattern occurs within a respective range of a distance in said dictionary, wherein each main scan line not satisfying the range according to the dictionary is counted as an error; and third program code means for determining a detection of the semicircle when the number of errors is less than a predetermined threshold.

8. The recording medium as claimed in claim 7, wherein the predetermined commencement requirement comprises requirements in which a ratio of black pixels occurring on a current main scan line between predetermined edge patterns is more than a predetermined value, and, also, a ratio of white pixels at the same positions but on an immediately preceding main scan line is more than a predetermined value.

9. The recording medium as claimed in claim 7, wherein:

the number of errors comprises any one of the predetermined main scan lines on which a predetermined left or right edge pattern does not occur, the number of successive main scan lines on which a predetermined left edge pattern does not occur, and the number of successive main scan lines on which the predetermined right edge pattern does not occur.

* * * * *